United States Patent [19]

Iino et al.

[11] Patent Number: 4,944,201

[45] Date of Patent: Jul. 31, 1990

[54] APPARATUS FOR CONTROLLING CONTINUOUSLY VARIABLE AUTOMOTIVE TRANSMISSION

[75] Inventors: Takashi Iino; Yoshihiro Katagiri, both of Saitama, Japan

[73] Assignee: Honda Giken Kogyo Kabushiki Kaisha, Tokyo, Japan

[21] Appl. No.: 137,756

[22] Filed: Dec. 24, 1987

[51] Int. Cl.$^5$ ................ B60K 41/14; F16D 31/02
[52] U.S. Cl. ............................. 74/868; 60/448; 60/449
[58] Field of Search ............ 74/867, 868; 60/448, 60/449

[56] References Cited

U.S. PATENT DOCUMENTS

| | | | |
|---|---|---|---|
| 3,054,263 | 7/1960 | Budzich | 60/447 |
| 3,230,699 | 1/1966 | Hann | 60/444 |
| 3,238,723 | 2/1964 | Young | 60/448 X |
| 3,362,262 | 1/1968 | Brueder | 74/868 |
| 3,406,721 | 10/1968 | Jenney | 137/625.69 |
| 3,442,153 | 5/1969 | Ross | 74/687 |
| 3,455,184 | 7/1969 | Frandsen | 74/687 |
| 3,508,401 | 4/1970 | Aplin | 60/389 |
| 3,733,931 | 5/1973 | Nyman et al. | 74/868 |
| 3,910,043 | 10/1975 | Clerk | 60/449 X |
| 3,941,016 | 3/1976 | Will | 74/868 |
| 4,087,969 | 5/1978 | Takahashi | 60/464 |
| 4,102,131 | 7/1978 | Reynolds | 60/449 X |
| 4,111,074 | 9/1978 | Northup | 74/867 |
| 4,120,540 | 10/1978 | Devlieg | 303/117 |
| 4,158,290 | 6/1979 | Cornell | 60/448 X |

(List continued on next page.)

FOREIGN PATENT DOCUMENTS

| | | |
|---|---|---|
| 0127082 | 5/1984 | European Pat. Off. . |
| 0239365 | 9/1987 | European Pat. Off. . |
| 3401381 | 7/1985 | Fed. Rep. of Germany . |
| 54-134252 | 10/1979 | Japan . |
| 54-134253 | 10/1979 | Japan . |
| 55-1294 | 1/1980 | Japan . |
| 55-14312 | 1/1980 | Japan . |
| 56-95722 | 8/1981 | Japan . |
| 57-70968 | 5/1982 | Japan . |
| 57-76357 | 5/1982 | Japan . |
| 60-95263 | 5/1985 | Japan . |
| 61-207229 | 9/1986 | Japan . |
| 62-127562 | 6/1987 | Japan . |
| 62-237164 | 10/1987 | Japan . |
| 473997 | 7/1969 | Switzerland . |
| 1021873 | 3/1966 | United Kingdom . |

Primary Examiner—Dwight Diehl
Assistant Examiner—Harold F. Macris
Attorney, Agent, or Firm—Lyon & Lyon

[57] ABSTRACT

A hydraulically operated continuously variable automotive transmission includes a transmission ratio controlling member and a hydraulic actuator operatively coupled to the transmission ratio controlling member for continuously operating the transmission ratio controlling member to increase or reduce the transmission ratio of the continuously variable automotive transmission. A control valve is provided for applying a controlling hydraulic pressure to the hydraulic actuator dependent on the difference between a first control force commensurate with an indication of the automobile driver's intention of acceleration or deceleration and a second force commensurate with the engine rotational speed, in order to change the direction in which the hydraulic actuator is operated. The control valve includes, but is not limited to, a cylinder having two ports communicating with the hydraulic actuator, a port communicating with a source of hydraulic pressure, and a port communicating with an oil tank, a first spool slidably disposed in the cylinder and slidable dependent on the difference between the first and second control forces for selectively bringing the ports into and out of communication, a second spool slidably disposed in the first spool and movable in response to a control force commensurate with a control signal, and variable restrictions disposed between the first and second spools for varying the amount of controlling hydraulic pressure applied to the hydraulic actuator.

6 Claims, 3 Drawing Sheets

U.S. PATENT DOCUMENTS

| | | | |
|---|---|---|---|
| 4,170,153 | 10/1979 | Mizuno et al. | 74/868 |
| 4,187,877 | 2/1980 | Hodgson | 137/596 |
| 4,218,884 | 8/1980 | Gold | 60/449 X |
| 4,232,572 | 11/1980 | Ross et al. | 74/867 X |
| 4,253,347 | 3/1981 | Mizuno | 74/862 |
| 4,261,229 | 4/1981 | Mizuno | 74/866 |
| 4,368,653 | 1/1983 | Mizuno | 74/868 |
| 4,399,886 | 8/1983 | Pollman | 180/197 |
| 4,444,093 | 4/1984 | Koga | 91/488 |
| 4,478,134 | 10/1984 | Kawahara | 91/488 |
| 4,509,125 | 4/1985 | Fattic | 364/424.1 |
| 4,649,485 | 3/1987 | Osanai | 364/424.1 |
| 4,662,248 | 5/1987 | Greenwood | 74/868 X |
| 4,665,773 | 5/1987 | Hiramatsu | 74/866 |
| 4,693,144 | 9/1987 | Eggert | 74/868 |
| 4,699,571 | 10/1987 | Bartholomaus | 417/213 |
| 4,699,604 | 10/1987 | Yokoyama | 74/868 X |
| 4,702,128 | 10/1987 | Oshiage | 74/866 |
| 4,715,258 | 12/1987 | Shigematsu | 74/866 |
| 4,716,791 | 1/1988 | Ohzono et al. | 74/867 |
| 4,727,771 | 3/1988 | Niwa | 74/866 |
| 4,729,103 | 3/1988 | Oshiage | 364/424.1 |
| 4,729,263 | 3/1988 | Hopff et al. | 74/867 |
| 4,730,518 | 5/1988 | Miyawaki | 74/866 |
| 4,730,523 | 3/1988 | Takahashi | 74/868 |

APPARATUS FOR CONTROLLING CONTINUOUSLY VARIABLE AUTOMOTIVE TRANSMISSION

BACKGROUND OF THE INVENTION

The present invention relates to an apparatus for controlling a hydraulically operated continuously variable automotive transmission including a hydraulic actuator operatively coupled to a transmission ratio controlling member for continuously operating the transmission ratio controlling member to increase or reduce the transmission ratio of the continuously variable automotive transmission, and, in particular, to such control apparatus having a control valve for applying a controlling hydraulic pressure to the hydraulic actuator dependent on the difference between a first control force commensurate with an indication of the driver's intention of acceleration or deceleration and a second force commensurate with a rotational engine speed, in order to change the direction in which the hydraulic actuator is operated.

Conventional apparatus for controlling hydraulically operated continuously variable automotive transmissions have a control valve including a cylinder and a spool valve slidably disposed in the cylinder, the spool valve being movable dependent on the difference between first and second control forces applied to the control valve. The control valve is connected to a hydraulic actuator that is operatively coupled to a transmission ratio controlling member of the hydraulically operated continuously variable automotive transmission.

In such a conventional control apparatus, the rate of change $di/dt$ of the transmission ratio $i$ per unit time can be given by the equation (1):

$$\frac{di}{dt} = K \cdot (Neo - Ne) \quad (1)$$

where $Neo$ is a target rotational engine speed, $Ne$ is a detected rotational engine speed, and $K$ is a gain. The detected rotational engine speed $Ne$ is expressed by the following equation (2):

$$Ne = C \cdot V \cdot i \quad (2)$$

where $V$ is the speed of travel of the automobile or the output rotational ending speed, and $C$ is a constant. Therefore, the rate of change $dNe/dt$ of the detected rotational engine speed $Ne$ is as follows:

$$\frac{dNe}{dt} = C \cdot V \cdot \frac{di}{dt} + C \cdot i \cdot \frac{dV}{dt} \quad (3)$$

Since the automobile speed $V$ does not immediately vary greatly even if the speed is changed while the automobile is running, $dV/dt \approx 0$, and hence the equation (3) approximates to the following equation (4):

$$\frac{dNe}{dt} = C \cdot V \cdot \frac{di}{dt} \quad (4)$$

From the equations (1) and (4), we get $$\frac{dNe}{dt} = K' \cdot V \cdot (Neo - Ne) \quad (5)$$

where $K' = C \cdot K$.

Since the gain $K$ is constant and so is the gain $K'$, it can be understood from the equation (5) that $dNe/dt$ is proportional to the vehicle speed $V$.

If the gain $K'$ in the equation (5) were set such that $dNe/dt$ would be of an appropriate value at a low vehicle speed $V$, then $dNe/t$ might be too high when the vehicle speed $V$ would be increased. This would cause the engine rotational speed to increase or decrease abruptly, thereby allowing the difference $(Neo - Ne)$ to go alternately positive and negative in repeated cycles, with the result that the operation to change the transmission ratio would become unstable.

Conversely, if the gain $K'$ were selected such that $dNe/dt$ would be of an appropriate value at a high vehicle speed $V$, then $dNe/t$ might be too low when the vehicle speed $V$ would be reduced, resulting in a slow response.

The above problem can be solved by reducing the gain $K'$ at a higher vehicle speed and increasing the gain $K'$ at a lower vehicle speed. This can be achieved by varying the amount of controlling hydraulic pressure supplied to the hydraulic actuator according to the vehicle speed for thus changing the speed of operation of the hydraulic actuator according to the vehicle speed.

One simple means for varying the amount of controlling hydraulic pressure supplied to the hydraulic actuator would be a variable restriction disposed between the hydraulic actuator and the control valve that has an intermediate position in which the degree of restriction is continuously variable for directional control. With the variable restriction, however, insofar as the stroke of the spool of the control valve is small, characteristic curves, as shown in FIG. 4 of the accompanying drawings, indicative of the amount of controlling hydraulic pressure supplied to the hydraulic actuator would not reflect different vehicle speed parameters $\alpha1'$, $\alpha2'$, $\alpha3'$, $\alpha4'$, ... which determine the degree of opening of the variable restriction, and fine transmission ratio control would be impossible to perform.

SUMMARY OF THE INVENTION

In view of the aforesaid problems of the conventional control apparatus, it is an object of the present invention to provide an apparatus for controlling a hydraulically operated continuously variable automotive transmission while achieving both stability and response and at the same time making it possible to perform fine transmission ratio control.

According to the present invention, there is provided an apparatus for controlling a hydraulically operated continuously variable transmission in an automobile having an engine, the transmission including a transmission ratio controlling member and a hydraulic actuator operatively coupled to the transmission ratio controlling member for continuously operating the transmission ratio controlling member to increase or reduce the transmission ratio of the continuously variable automotive transmission. The apparatus comprises a control valve for applying a controlling hydraulic pressure to the hydraulic actuator dependent on the difference between a first control force commensurate with an indication of the automobile driver's intention of acceleration of deceleration of the automobile and a second force commensurate with the rotational speed of the engine, in order to change the direction in which the hydraulic actuator is operated. The control valve comprises a cylinder having first and second ports communicating with the hydraulic actuator, a third port communicating with a source of hydraulic pressure, and a fourth port communicating with an oil tank, a first spool slidably disposed in the cylinder and slidable dependent on the difference between the first and second control forces for selectively bringing the third and first ports into mutual communication and the second and fourth ports into mutual communication or bringing the third and second ports into mutual communication and the first and fourth ports into mutual communication, a second spool slidably disposed in the first spool and movable in response to a control force commensurate with a control signal, and variable restriction means disposed between the first and second spools for varying the amount of controlling hydraulic pressure applied to the hydraulic actuator.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
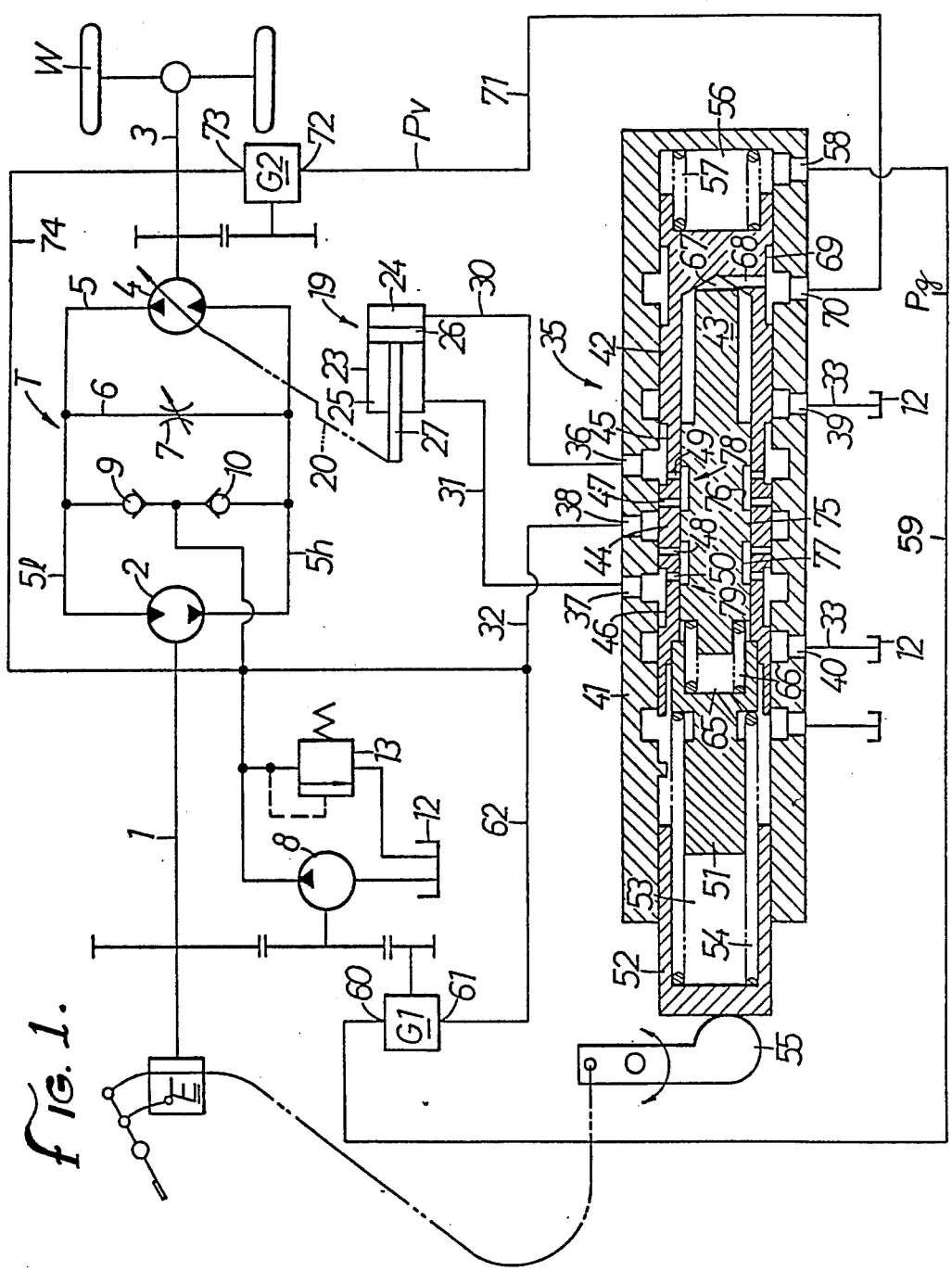
FIG. 1 is a circuit diagram, partly in cross section, of an apparatus for controlling a hydraulically operated continuously variable transmission according to the present invention.

FIG. 1 shows a hydraulically operated, continuously variable transmission T for use in an automobile including a hydraulic pump 2 of the fixed displacement type having an input shaft 1 drivable by an automotive engine E, and a hydraulic motor 4 of the variable displacement type having a output shaft 3 disposed coaxially with the hydraulic pump 2 for driving wheels W. The hydraulic pump 2 and the hydraulic motor 4 are interconnected by a closed hydraulic circuit 5. Specifically, the closed hydraulic circuit 5 includes a higher-pressure oil passage 5h interconnecting the outlet port of the hydraulic pump 2 and the inlet port of the hydraulic motor 4, and a lower-pressure oil passage 5l interconnecting the outlet port of the hydraulic motor 4 and the inlet port of the hydraulic pump 2.

A bypass oil passage 6 is coupled between the outlet and inlet ports of the hydraulic pump 2, i.e., the higher- and lower-pressure oil passages 5h, 5l, in bypassing relation to the hydraulic motor 4. The bypass oil passage 6 has a clutch valve 7.

A supply pump 8 which can be driven by the input shaft 1 through a gear train has an outlet port connected via check valves 9, 10 to the lower- and higher-pressure oil passages 5l, 5h for supplying working oil from an oil tank 12 to the closed hydraulic circuit 5 in order to compensate for a shortage of oil in the circuit 5. A relief valve 13 is connected between the outlet port of the supply pump 8 and the oil tank 12 for releasing an excessive oil pressure discharged by the supply pump 8.

The opening of the clutch valve 7 is controlled by a control device (not shown). Power transmission between the input shaft 1 and the output shaft 3 can be controlled by the amount of opening of the clutch valve 7.

The transmission ratio i of the continuously variable transmission T is controlled by continuously changing the displacement of the hydraulic motor 4 with respect to the fixed displacement of the hydraulic pump 2 by a hydraulic cylinder assembly 19 serving as a hydraulic actuator. If the displacement of the hydraulic motor 4 is increased, the transmission ratio i is also increased. If the displacement of the hydraulic motor 4 is reduced, the transmission ratio i is also reduced. Thus, the transmission ratio i between the rotational speed of the engine E and the rotational speed of the wheels W can continuously be varied.

Figure 2:
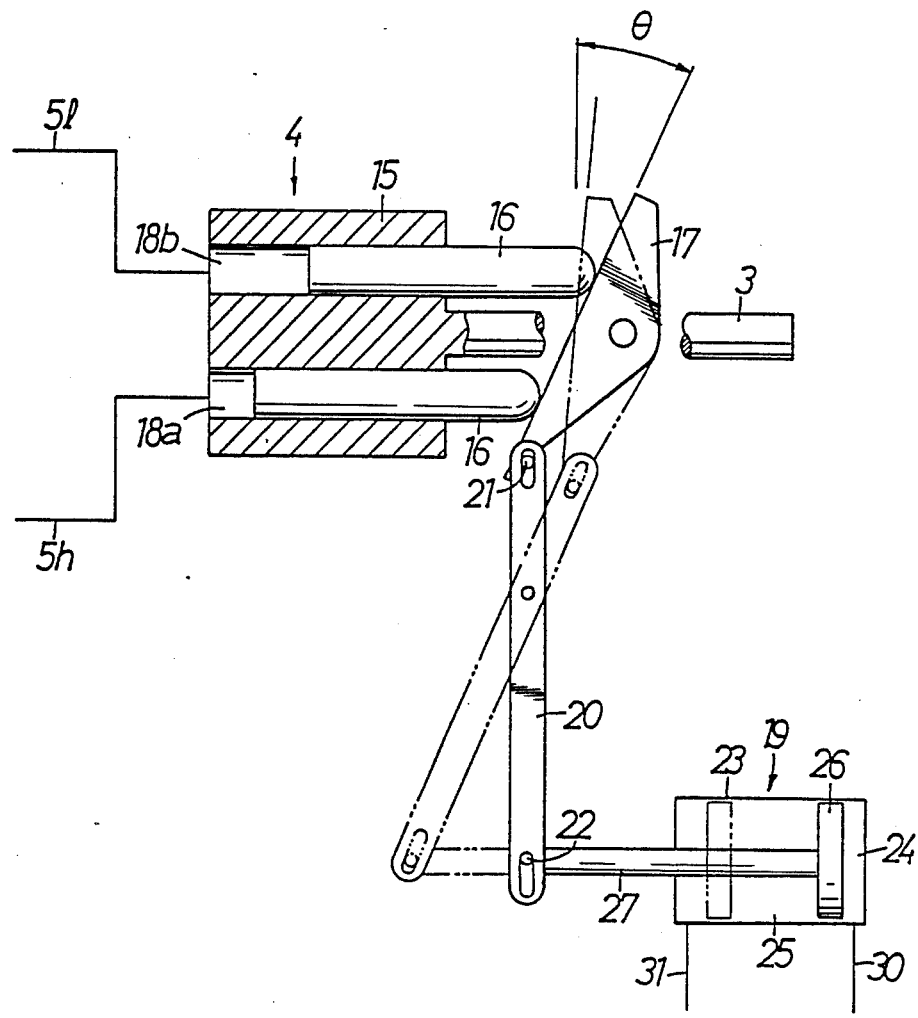
FIG. 2 is a view showing how a hydraulic motor and a hydraulic cylinder are operatively coupled to each other.

As illustrated in FIG. 2, the hydraulic motor 4 comprises a variable-displacement axial piston motor, for example. The hydraulic motor 4 includes a cylinder block 15 coupled to the output shaft 3 and a plurality of pistons 16 slidably fitted in the cylinder block 15 and circumferentially spaced in an annular pattern around the rotational axis of the output shaft 3. A swash plate 17 serving as a transmission ratio controlling member for limiting the reciprocating stroke of the pistons 16 is held against the tip ends of the pistons 16, the swash plate 17 being inclined at a variable angle $\theta$. A cylinder chamber 18a defined in the cylinder block 15 and receiving one of the pistons 16 which is an expanding stroke communicates with the higher-pressure oil passage 5h. A cylinder chamber 18b defined in the cylinder block 15 and receiving one of the pistons 16 which is in a contracting stroke communicates with the lower-pressure oil passage 5l.

The hydraulic motor 4 of the above structure is known in the art. Higher-pressure oil discharged from the hydraulic pump 2 is delivered via the higher-pressure oil passage 5h into the cylinder chamber 18a, and lower-pressure oil discharged from the cylinder chamber 18b is returned via the lower-pressure oil passage 5l back to the hydraulic pump 2. During this time, the cylinder block 15 and hence the output shaft 3 are rotated by reactive torque imposed by the swash plate 17 on the piston 16 in the expanding stroke.

The displacement of the hydraulic motor 4 is determined by the stroke of the pistons 16. Thus, the transmission ratio i of the transmission T can continuously be varied from a minimum level to a maximum level by changing the angle $\theta$ of the swash plate 17 from a maximum value (indicated by the solid lines) to a minimum value (indicated by the two-dot-and-dash lines). The transmission ratio i is given by the following equation:

$$\text{Transmission ratio } i = \frac{\text{Input rotational speed}}{\text{Output rotational speed}}$$
$$= 1 + \frac{\text{Motor displacement}}{\text{Pump displacement}}$$

One end of the swash plate 17 is coupled by a pin 21 to one end of a pivotally mounted link 20, the other end of which is joined to a hydraulic cylinder assembly 19 by a pin 22 extending parallel to the pin 21.

The cylinder assembly 19 comprises a cylinder 23, a piston 26 slidably fitted in the cylinder 23 and dividing the interior of the cylinder 23 into a head chamber 24 and a rod chamber 25, and a piston rod 27 integrally joined to the piston 26 and extending movably in a fluid-tight manner through the end of the cylinder 25 adjacent to the rod chamber 25.

The distal end of the piston rod 27 is coupled to the other end of the swingable link 20 by the pin 22. When the piston 26 is moved to the rightmost position, the angle $\theta$ of the swash plate 17 is maximized to maximize the displacement of the hydraulic motor 4 for thereby increasing the transmission ratio i to a maximum. Conversely, when the piston 26 is moved to the leftmost position, the swash plate angle $\theta$ is reduced to a minimum as indicated by the two-dot-and-dash lines, and so is the displacement of the hydraulic motor 4, minimizing the transmission ratio i.

Referring back to FIG. 1, a control valve 35 is connected between an oil passage 30 coupled to the head chamber 24 of the hydraulic cylinder assembly 19 and an oil passage 31 coupled to the rod chamber 25 of the hydraulic cylinder assembly 19, and an oil supply passage 32 coupled to the supply pump 8 and an oil release passage 33 coupled to the oil tank 12.

The control valve 35 includes a cylinder 41 having ports 36, 37 communicating with the oil passages 30, 31, a port 38 communicating with the oil supply passage 32, and ports 39, 40 communicating with the oil tank 12 via the oil release passage 33, a first spool 42 slidably fitted in the cylinder 41, and a second spool 43 slidably fitted in the first spool 42.

The first spool 42 is basically in the form of a bottomed hollow cylinder having two annular grooves 45, 46 defined in its outer peripheral surface substantially centrally in the axial direction, with an annular land 44 disposed axially between the annular grooves 45, 46. The land 44 is positioned substantially radially inwardly of the port 38, and the annular grooves 45, 46 are positioned substantially radially inwardly of the ports 36, 37, respectively. The land 44 has a pair of axially spaced oil passages 47, 48 defined radially therethrough and capable of communication with the port 38. The first spool 42 also includes an oil passage 49 opening into the annular groove 45 and an oil passage 50 opening into the annular groove 46, the oil passages 49, 50 opening into the interior space of the first spool 42.

A closure member 51 is fitted in the open end of the first spool 42. A coil spring 54 is housed in a spring chamber 53 defined in the cylinder 41 between the closure member 51 and a receiver member 52 slidably fitted in the lefthand end of the cylinder 41. A presser 55 movable dependent on the depth to which an accelerator pedal is depressed is held against the outer end surface of the receiver member 52. The righthand end of the cylinder 41 and the closed end of the first spool 42 define therebetween a hydraulic pressure chamber 56 accomodating therein a coil spring 57. The spring chamber 53 is vented to atmosphere, and the hydraulic pressure chamber 56 is connected to an output port 60 of a first hydraulic governor G1 through a port 58 defined in the cylinder 41 by a pilot oil passage 59.

The first hydraulic governor G1 is operated in response to rotation of the input shaft 1, and has an input port 61 coupled to an oil passage 62 connected to the supply pump 8. The output port 60 of the first hydraulic governor G1 thus produces a hydraulic governor pressure Pg proportional to the speed of rotation of the engine E and applies the hydraulic governor pressure Pg to the hydraulic pressure chamber 56.

A first control force F1 proportional to the amount of throttle opening as an indiation of the driver's intention of acceleration or deceleration is applied to the lefthand end of the first spool 42, and a second control force F2 proportional to the engine speed is imposed on the righthand end of the first spool 42. The first control force F1 is produced by the spring load of the spring 54. When the amount of throttle opening is increased, the presser 55 moves the first spool 42 to the right to increase the first control force F1. Conversely, when the amount of throttle opening is reduced, the presser 55 allows the first spool 42 to move to the left, reducing the first control force F1. The second control force F2 is expressed by F2=F21+F22 where F21 is the spring load of the spring 57 and F22 is the hydraulic pressure equal to the product of the area of the righthand end of the first spool 42 and the hydraulic pressure Pg discharged by the first hydraulic governor G1.

If F1=F2, then the ports 36, 37, 38 are held out of communication with each other, and the piston 26 of the hydraulic cylinder assembly 19 is held at rest. The displacement of the hydraulic motor 4 is fixed, and so is the transmission ratio i. If F1<F2, then the first spool 42 is moved to the left to bring the ports 36, 38 into mutual fluid communication and also bring the ports 37, 40 into mutual fluid communication through the annular groove 46. Therefore, the piston 26 of the hydraulic cylinder assembly 19 is moved leftwardly thereby to reduce the displacement of the hydraulic motor 4 and hence lower the transmission ratio i. If F1>F2, then the first spool 42 is moved to the right to bring the ports 37, 38 into mutual fluid communication and also bring the ports 36, 39 into mutual fluid communication through the annular groove 45. Therefore, the piston 26 of the hydraulic cylinder assembly 19 is moved rightwardly thereby to increase the displacement of the hydraulic motor 4 and hence increase the transmission ratio i.

The relationship between operation of the first spool 42 of the control valve 35, the piston 26 of the hydraulic cylinder assembly 19, and the hydraulic motor 4 and the transmission ratio i is given in the following table 1:

TABLE 1

|  | F1 = F2 | F1 < F2 | F1 > F2 |
| --- | --- | --- | --- |
| First spool 42 | Neutral position | Moved toward lefthand position | Moved toward righthand position |
| Piston 26 | Stopped | Moved to left | Moved to right |
| Hydraulic motor 4 | Fixed displacement | Smaller displacement | Larger displacement |
| Transmission ratio i | Fixed | Lower | Higher |

A spring chamber 65 is defined in the first spool 42 between the lefthand end of the second spool 43 and the closure member 51, the spring chamber 65 communicating with the spring chamber 53. The spring chamber 65 houses therein a coil spring 66 for normally urging the second spool 43 to move to the right. A hydraulic pressure chamber 67 is defined between the righthand end of the first spool 42 and the righthand end of the second spool 43. The hydraulic pressure chamber 67 is continuously in communication with a port 70 defined in the cylinder 41 through an oil passage 68 and an annular groove which are defined in the second spool 43. The port 70 is connected through a pilot oil passage 71 to an output port 72 of a second hydraulic governor G2.

The second hydraulic governor G2 is operated in response to rotation of the output shaft 3, the second hydraulic governor G2 having an input port 73 connected to an oil passage 74 joined to the supply pump 8. Therefore, the output port 72 of the second hydraulic governor G2 generates a governor pressure Pv proportional to the vehicle speed and applies the governor pressure Pv as a control signal to the hydraulic chamber 67.

The spring load of the spring 66 is applied as a third control force F3 to the lefthand end of the second spool 43, and a hydraulic force commensurate with the vehicle speed is applied as a fourth control force F4 to the righthand end of the second spool 43. The second spool 43 is therefore moved in an axial direction dependent on the difference between the third and fourth control forces F3, F4.

The second spool 43 has a pair of axially spaced annular grooves 76, 77 defined in its outer peripheral surface with an annular land 75 between the grooves 76, 77. The inner ends of the oil passages 47, 49 for interconnecting the ports 38, 36 and the inner ends of the oil passages 48, 50 for interconnecting the ports 38, 37 can be restricted by the second spool 43 as the annular grooves 76, 77 are moved relative to these inner ends of the oil passages. More specifically, the oil passages 47, 49; 48, 50 and the annular grooves 76, 77 jointly constitute variable restriction mechanisms 78, 79, respectively, for continuously or steplessly adjusting the the amount of restricted opening between the oil passages 47, 49 and the oil passages 48, 50. Since the position of the second spool 43 with respect to the first spool 42 is determined by the vehicle speed, the amount of the working oil supplied to and discharged from the hydraulic cylinder assembly 19 can be continuously adjusted by the variable restriction mechanisms 78, 79 dependent on the vehicle speed.

The relationship between the opening of the variable restriction mechanisms 78, 79, the amount of controlling hydraulic pressure supplied to the hydraulic cylinder assembly 19, and the rate of change $di/dt$ of the transmission ratio $i$ when $F1=F2$ is shown in the following table 2:

TABLE 2

| Vehicle speed | Low | Medium | High |
|---|---|---|---|
| Variable restriction mechanisms | Fully open | Partly open | Fully closed |
| Amount of controlling hydraulic pressure | Large | Medium | Small |
| di/dt | Large | Medium | Small |

As shown in Table 2 above, as the vehicle speed goes higher, the amount of controlling hydraulic pressure supplied to the hydraulic cylinder assembly 19 is reduced, and so is the rate of change $di/dt$ of the transmission ratio. Since the gain $K'$ expressed by the equation (5) is smaller than the vehicle speed is higher, and is larger when the vehicle speed is lower, the transmission ratio can be controlled without allowing the rate of change $dNe/dt$ of the engine rotational speed to vary in proportion to the vehicle speed. Accordingly, both stability and response can be achieved in controlling the transmission ratio.

Figure 3:
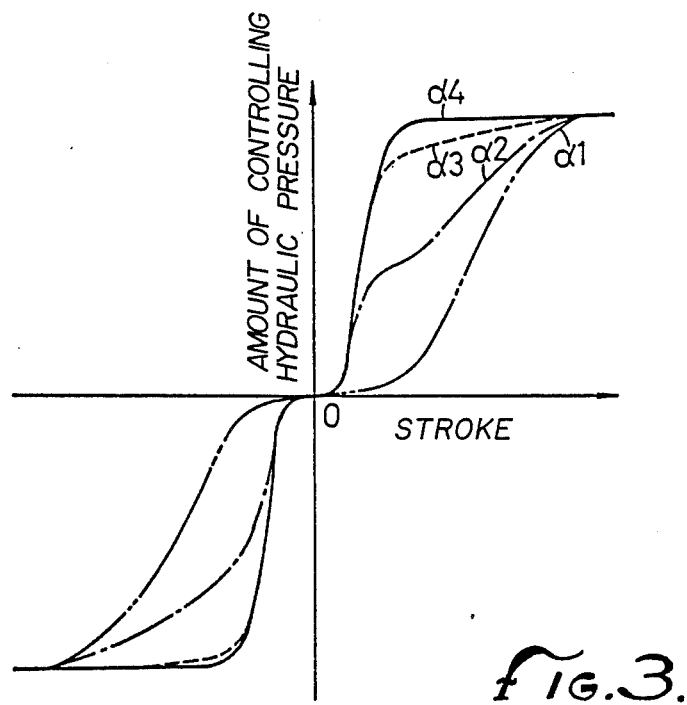
FIG. 3 is a graph showing characteristic curves of the amount of controlling hydraulic pressure supplied from a control valve.
Figure 4:
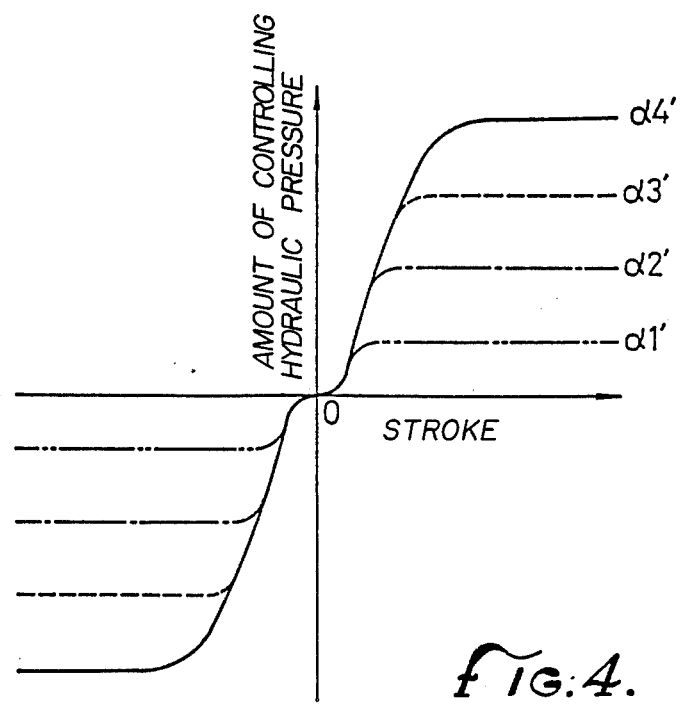
FIG. 4 is a graph showing characteristic curves of the amount of controlling hydraulic pressure supplied from a control valve through a variable restriction.

With the variable restriction mechanisms 78, 79 disposed between the first and second spools 42, 43 in the control valve 35, there are obtained characteristic curves, as shown in FIG. 3, which are representative of the amount of controlling hydraulic pressure. These characteristic curves show different amounts of controlling hydraulic pressure due to different vehicle speed parameters $\alpha 1$, $\alpha 2$, $\alpha 3$, and $\alpha 4$ in the range in which the stroke of the first spool 42 is small, so that fine transmission ratio control can be effected.

The present invention is not limited to the hydraulically operated, continuously variable automotive transmission comprising the fixed-displacement hydraulic pump 2 and the variable-displacement hydraulic motor 4. The principles of the present invention are also applicable to a transmission comprising a variable-displacement hydraulic pump and a fixed-displacement hydraulic motor, or a transmission comprising a variable-displacement hydraulic pump and a variable-displacement hydraulic motor.

While the discharged hydraulic pressure from the supply pump 8 is employed in the above embodiment as the working pressure on the hydraulic cylinder assembly 19, a higher hydraulic pressure in the closed hydraulic circuit 5 may be utilized as the working pressure for producing a larger working force.

The detection of the throttle valve opening or the accelerator pedal depression may be replaced with the detection of the vacuum developed in the intake pipe of the engine, or the amount of fuel supplied which can be employed as an indication of the driver's intention of acceleration and deceleration.

The variable restriction mechanisms may be disposed between the first and second spools 42, 43 between the ports 36, 39 and the ports 37, 40.

Although a certain preferred embodiment has been shown and described, it should be understood that many changes and modifications may be made therein without departing from the scope of the appended claims.

What is claimed is:

1. An apparatus for controlling a hydraulically operated continuously variable transmission in an automobile having an engine, the transmission including a transmission ratio controlling member and a hydraulic actuator operatively coupled to the transmission ratio controlling member for continuously operating the transmission ratio controlling member to increase or reduce the transmission ratio of the continuously variable automotive transmission, said apparatus comprising a control valve which applies a controlling hydraulic pressure to said hydraulic actuator dependent on the difference between a first control force commensurate with an indication of the automobile driver's intention of acceleration or deceleration of the automobile and a second force commensurate with the rotational speed of the engine, in order to change the direction in which the hydraulic actuator is operated, said control valve comprising a cylinder having first and second ports communicating with said hydraulic actuator, a third port communicating with a source of hydraulic pressure, and a fourth port communicating with an oil tank, a first spool slidably disposed in said cylinder and slidable dependent on the difference between said first and second control forces for selectively bringing said third and first ports into mutual communication and said second and fourth ports into mutual communication or bringing said third and second ports into mutual communication and said first and fourth ports into mutual communication, a second spool slidably disposed in said first spool and movable in response to a control force commensurate with a control signal, and variable restriction means disposed between said first and second spools for varying the amount of controlling hydraulic pressure applied to said hydraulic actuator.

2. An apparatus for controlling a hydraulically operated continuously variable automotive transmission according to claim 1, wherein said control signal is indicative of the speed of the automobile, said variable restriction means including means for reducing the amount of controlling hydraulic pressure when the speed of the automobile is high and for increasing the amount of controlling hydraulic pressure when the speed of the automobile is low.

3. An apparatus for controlling a hydraulically operated continuously variable automotive transmission according to claim 1, wherein said first spool has first and second axially spaced annular grooves defined in an outer peripheral surface thereof with a land therebetween, said first and second annular grooves and said land being positioned substantially radially inwardly of said first, second, and third ports, respectively.

4. An apparatus for controlling a hydraulically operated continuously variable automotive transmission according to claim 3, wherein said variable restriction means comprises first and second variable restriction mechanisms, said first variable restriction mechanism comprising a first oil passage defined in said land, a second oil passage defined in said first spool and opening into said first annular groove, and a third annular groove defined in an outer peripheral surface of said second spool, said first and second oil passages having radially inner ends restrictable by said third annular groove, said second variable restriction mechanism comprising a third oil passage defined in said land, a fourth oil passage defined in said first spool and opening into said second annular groove, and a fourth annular groove defined in the outer peripheral surface of said second spool, said third and fourth oil passages having radially inner ends restrictable by said fourth annular groove.

5. An apparatus for controlling a hydraulically operated continuously variable transmission in an automobile having an engine, the transmission including a hydraulic actuator for operatively controlling the transmission ratio to increase or reduce the transmission ratio of the continuously variable automotive transmission in response to the direction of movement of the actuator, said apparatus including, a control valve which applies a controlling hydraulic pressure to said hydraulic actuator dependent on the difference between a first control force commensurate with an indication of the automobile driver's intention of acceleration or deceleration of the automobile and a second force commensurate with the rotational speed of the engine, in order to change the direction in which the hydraulic actuator is operated, wherein a third control force indicative of the speed of the automobile is applied to the control valve for reducing the amount of controlling hydraulic pressure to said hydraulic actuator when the speed of the automobile is high and for increasing the amount of controlling hydraulic pressure to said hydraulic actuator when the speed of the automobile is low.

6. An apparatus for controlling a hydraulically operated continuously variable transmission having a variable transmission ratio in an automobile having an engine, the transmission including a hydraulic actuator for operatively controlling the transmission ratio to increase or reduce the transmission ratio of the continuously variable automotive transmission in response to the direction of movement of the actuator, said apparatus including, a control valve which applies a controlling hydraulic pressure to said hydraulic actuator dependent on the difference between a first control force commensurate with an indication of the automobile driver's intention of acceleration or deceleration of the automobile and a second force commensurate with the rotational speed of the engine, in order to change the direction in which the hydraulic actuator is operated, and means to vary a variable gain of the time rate of change of the transmission ratio according to the speed of the automobile, wherein said means to vary reduces the gain when the automobile speed is relatively high and increases the gain when the automobile speed is relatively low, and wherein said means to vary operates by applying a third control force indicative of the speed of the automobile to the control valve for continuously varying the amount of controlling hydraulic pressure to said hydraulic actuator between a reduced amount of controlling hydraulic pressure when the speed of the automobile is high and an increased amount of controlling hydraulic pressure when the speed of the automobile is low.

* * * * *